March 26, 1968    G. DE COYE DE CASTELET    3,374,693
AUTOMATIC SPEED-CHANGING MECHANISM
FOR AUTOMOBILE VEHICLES Filed Oct. 24, 1965      2 Sheets-Sheet 1

United States Patent Office 3,374,693
Patented Mar. 26, 1968

3,374,693
AUTOMATIC SPEED-CHANGING MECHANISM FOR AUTOMOBILE VEHICLES
Gaëtan de Coye de Castelet, Billancourt, France, assignor to Regie Nationale des Usines Renault, Billancourt, France
Filed Oct. 24, 1965, Ser. No. 504,353
Claims priority, application France, Nov. 17, 1964, 995,227, Patent 1,423,015
3 Claims. (Cl. 74—865)

ABSTRACT OF THE DISCLOSURE

An automatic control mechanism for automobile gearboxes comprising a tachometric governor operatively connected to actuate a gearbox by means of jacks selectively actuated through transistorized amplifiers and discharge electromagnetic valves controlling distributors which feed the jacks. The transistor amplifiers have bases which are selectively grounded through a rest contact of the governor and connected to a positive power source through a damping resistance, the emitters are connected to the positive terminal through the exciting coil of said valve and the collectors are grounded.

---

The present invention relates to automatic speed-changing mechanisms for automobile vehicles, and has for its object to improve such mechanisms by an advantageous association of its elements, which are essentially: a ratio-changing governor, a contactor actuated by the said governor, a set of transistorized amplifier circuits controlled by the said contactor, electro-hydraulic distributors controlled by the said circuits, hydraulic actuators controlled by the said distributors and a gearbox actuated by these hydraulic actuators.

According to the present invention, the governor is of the type described in U.S. patent application No. 439,285 filed by the same applicant on Mar. 12, 1965 and entitled: "Improvements in Foucault Current Devices for the Automatic Control of the Changes in Speed Ratios on Vehicles."

Such a governor, as regards its part concerned in the control of the speed ratios of the gearbox, causes these changes under the action of a magnet connected to the wheels of the vehicle and rotating in a metallic cup which as a result receives a torque due to the Foucault currents.

It is characterized in that the relative position of at least one of the magnets and its cup is modified as a function of the depression of the accelerator pedal.

The contactor is of the type described in U.S. Patent 3,299,234 filed by the Applicant on June 7, 1965, under the title: "Velocity Responsive Actuating Means."

Such a contactor comprises at least one pliable metal blade forming a movable electric contact, folded to S shape between two fixed end supports and one or other of two lateral fixed supports, each of these blades receiving a continuous inaction from a member connected to the cup of the governor, this action causing the sudden passage of the blade from one of its contacts to the other as a function of the state of movement of the magnet concerned, these states being defined by the value of its speed and the sign of its acceleration.

Each hydraulic distributor is of the type described in U.S. Patent 3,234,857 filed by the applicant on Feb. 8, 1965, and entitled: "Electro-Hydraulic Units for Controlling Hydraulic Receivers."

Such a distributor comprises a slide member permanently connected to a source of fluid under pressure, a discharge tank, a receiver apparatus and a discharge electromagnetic valve.

Depending on whether this electromagnetic valve is opened or closed, the slide member assumes one or other of two positions which respectively connect the receiver to the source of pressure fluid or to the discharge.

This apparatus has a remarkable speed and sensitivity of response, due to the method of controlling the slide member by the differential action of the fluid pressures acting on its ends and of which the balance is regulated by a leakage which is controlled by the discharge electromagnetic valve.

The electrical connection between the contactor and the solenoids of the distributors are established by amplifier circuits with grounded collector transistors and serving for the purpose of spark quenchers. In the practical embodiment of these circuits, they are engaged by a set of push-buttons, depending on the operations required.

The distribution controlled in this way actuate in their turn hydraulic actuators which act on the gear ratio-changing mechanism of a gearbox, which is of the epicyclic gear type according to a preferred embodiment of the invention.

However, the invention will be best understood from the description which follows, by way of example, of some of its diagrammatic and practical forms which are illustrated by the accompanying drawing, in which.

Figure 1:
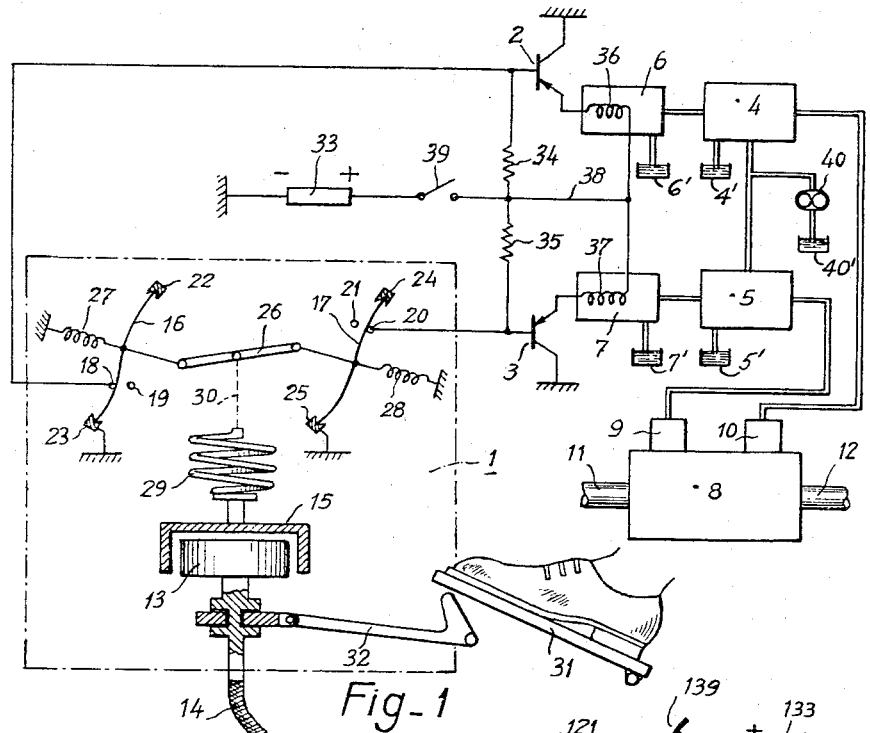
FIGURE 1 is an assembly diagram of such an arrangement.

The arrangement, which is completely shown in FIGURE 1, comprises: a governor 1, transistorized control circuits 2, 3 controlling distributors 4, 5 by means of discharge valves 6, 7, connected respectively to discharge reservoirs 4', 5', 6' and 7', and a gearbox 8 with its input shaft 11, its output shaft 12 and its hydraulic actuators 9, 10.

The governor 1 is formed by a Foucault current tachometric member and a blade-type contactor of S form. The tachometric member comprises a rotating magnet 13 driven by the output shaft 12 of the gearbox 8 by means of a flexible shaft 14, and a metal cup 15 in which the magnet rotates, thereby generating therein so-called currents, due to which a torque tends to drive the cup.

The contactor comprises at least two flexible metal blades 16, 17 which are bent to S form between two end supports, which are 22, 23 for one blade and 24, 25 for the other (23 and 25 being connected to ground).

Each of these blades, clamped in this way, can undergo small sudden lateral deformations, bearing against one or other of two contacts, which are 18, 19 for the blade 16 and 20, 21 for the blade 17. These changes are effected by the combined action of springs 27, 28 and a rocking lever 26, which receives the driving torque of the cup 15 by means of a spring 29. For simplicity in the drawing, the pivot axis of the rocking lever 26 is shown as being perpendicular to the plane of the figure, while the axis of the spring 29 is contained in this plane, so that the connection 30 between these two elements is represented symbolically by broken lines.

In addition, the axial position of the magnet 13 is connected with the degree of depression of the accelerator pedal 31 through a pivoting lever 32.

The electric control channels connecting the governor 1 to the discharge electromagnetic valves 6, 7 comprise respectively the transistors 2, 3 of the PNP type, which are in "grounded collector" connection. For this purpose, their bases are connected on the one hand to the contacts 18, 20 and on the other hand to the positive terminal of a battery 33 via the resistances 34, 35. The collectors of these transistors are connected to ground and their emitters are connected to the positive terminal of the battery by way of the coils 36, 37 of the discharge electromagnetic valves 6,7.

In accordance with such an assembly, the transistors 2, 3 serve part of relays, and also that of quenchers of the sparks which the contactor tends to produce. This second purpose results from the fact that, when there is a break for example in the control channel 34, 2, 18, because of the sudden movement of the blade 16 leaving the support 18 to pass to 19 (the switch 39 obviously being closed), the coil 36 tends to preserve for a certain time the magnetic energy which it has stored and, in accordance with the Lenz law, it imposes on the emitter of the transistor 2 a positive polarity which maintains the transistor conducting during this time and ensures the passage of the interrupting current of the coil 36 through the transistor 2 and the damping resistance 34.

This is obviously applied to the second control channel comprising the transistor 3, the coil 37 and the damping resistance 35, and also to any other supplementary channel which could be used within the scope of the present invention.

This arrangement operates as follows:

When stopped or when the vehicle is running at slow speed, the blades 16, 17, which are always connected to ground, bear respectively on their rest contacts 18 and 20. The switch 39 being closed, the transistors 2 and 3 are energized and the coils 36 and 37 are supplied with current. The electromagnetic valves 6 and 7 are then closed and the distributors 4 send oil under pressure from the pump 40 fed by the reservoir 40' into the hydraulic actuators 9 and 10, this bringing the gearbox 8 to the first speed ratio.

When the speed of the vehicle increases, the rocking lever 26 accentuates its tractive effort on the springs 27 and 28.

The spring 27 is weaker than the spring 28, so that the blade 16 is the first to change its position and come to bear against its working contact 19, thus de-energizing the transistor 2.

From this time, the electromagnetic valve 6 is no longer supplied with current and the distributor 4 places the hydraulic actuator 10 for discharge, this bringing the gearbox 8 to the second speed ratio.

When the speed increases still further, the effort of the rocking lever 26 is increased and the blade 17 in its turn moves to the working position on the contact 21, de-energizing the transistor 3 and the coil 37.

The distributor 5 then brings the hydraulic actuator 9 to the discharge position, this bringing the gearbox 8 to the third speed.

The changing down of the speeds is effected in the same manner but in the inverse sense.

These operational conditions can be summarized in the following table, in which the plus sign indicates the state of excitation and the minus sign the absence of excitation of a coil:

| Gearbox | Coil 36 | Coil 37 |
| --- | --- | --- |
| 1st speed | + | + |
| 2nd speed | − | + |
| 3rd speed | − | − |

Neutral or reverse are engaged by a manually controlled hydraulic valve which has not been shown in FIGURE 1.

Figure 2:
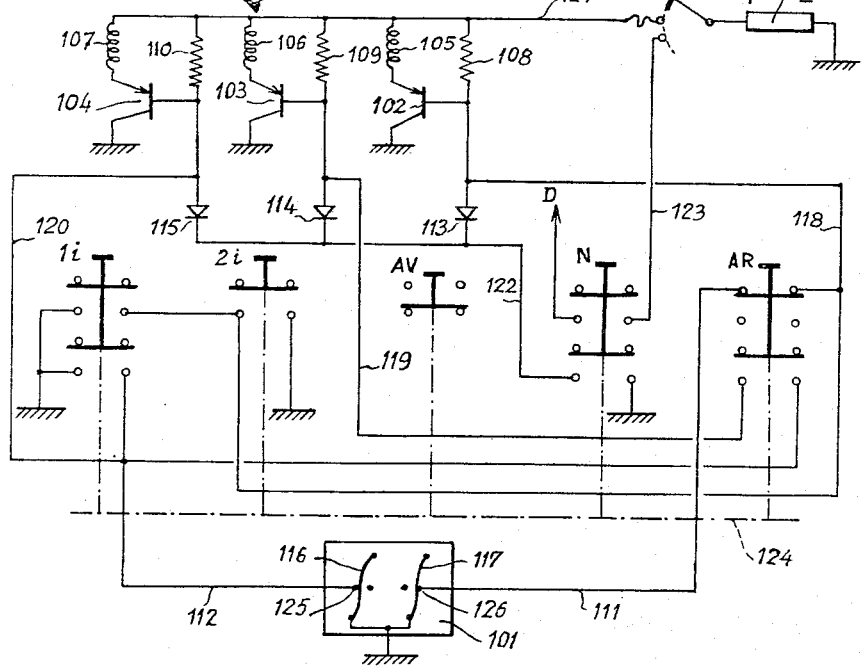
FIGURE 2 is a more detailed variant of the electrical conections of the previous arrangement.

A more elaborate form of the electrical control, illustrated in FIGURE 2, always comprises a governor 101 having two S-shaped blades 116 and 117, and two control channels extending from the said governor via the conductors 111 and 112. However, a set of five press-button switches 1i, 2i, AV, N, AR (the respective purposes of which will be explained later and which are mechanically connected by a device 124 of known type such that the depression of one button causes the lifting of all the others) enables three transistors 102, 103, 104 of the PNP type to be controlled by three conductors 118, 119, 120, said transistors being as before "grounded collector" transistors, with their emitters respectively in series with the coils 105, 106, 107 of three discharge electromagnetic valves, each of which, as before, controls a distributor acting on a hydraulic actuator of the gearbox.

In this FIGURE 2, the hydraulic parts of these latter channels have not been shown.

As before, the transistors have their collectors grounded and their bases connected on the one hand to the control wires 118, 119, 120 and on the other hand to damping resistances 108, 109, 110 looping the circuits of the coils 105, 106, 107 by a conductor 121 connected to the positive pole of the battery by a switch 139. The bases of the transistors are in addition connected through diodes 113, 114, 115 to a conductor 122 which is connected, as indicated in the drawing, to one fixed contact of the fourth row (counting from top to bottom) of a commutator N which cntrols the connection to neutral, the second contact of the same row being grounded.

The plunger of N is fast with two movable contact bars, which at rest bear respectively on fixed contacts of the first and third row.

At the second row of N, one of the fixed contacts is connected to the starter D and the other to the positive terminal of the battery via the switch 139 by means of a wire 123.

The commutator AV, which applies the automatic speed control in advance running, has two rows of contacts without connections, serving solely as stops to the bar connected to the button.

The commutator AR for reverse running has four rows of fixed contacts and two movable bars which at rest are applied to the contacts of the first and third row. One of its contacts in the first row is connected to the terminal 126 of the governor. The other is connected to the base of the transistor 102 and to two second row contacts of the commutators 1i and 2i. One of its contacts in the fourth row is connected to the base of the transistor 103 (via the wire 119) and the other is connected to the base of the transistor 104 (via 120), to the terminal 125 of the governor (via 112), and to a contact of the fourth row of 1i.

The commutator 2i, which controls the prevention of the third speed in automatic forward running, comprises a movable bar and two rows of fixed contacts, of which one of those of the second row is grounded, the other being connected to 1i, to AR and to the base of the transistor 102, as already explained for the connections of AR.

The commutator 1i, which controls in forward running the prevention of the second and the third speeds, has four rows of fixed contacts, of which one of those of the second row is grounded, as well as one of those of the fourth row, the other fixed contact of the fourth row being connected to the terminal 125 of the governor 101 by the control wire 112.

The blades 116 and 117 of the governor are of course grounded.

This arrangement operates as follows:

With the switch 139 closed, action on the button N automaticlly causes the lifting of all the other buttons. It is easy to visualize this state of the arrangement by reference to FIGURE 2 (although in the latter, it is the button AV which is depressed).

In this state, the wire D of the starter is connected to the positive terminal of the battery through the second row of the button N, of which the fourth row excites the assembly of the three transistors, for connecting the wire 122 to ground, by causing a drop in their base potentials through the resistances 108, 109, 110. The coils 105, 106, 107 are then supplied and the gearbox is brought to (or kept at) neutral. The button AR, through its first row of contacts, confirms the connection to ground of the base of the transistor 102. The base of the transistor 104 has also confirmed its grounding through 112 and 125. The other commutators or switches (AV, 2i, 1i) do not make any connection.

When acting on the button AV, the button N is lifted: it is then in the position shown in FIGURE 2.

In this position, the connection to the starter D is broken, and also the connection of the wire 122 to ground. The buttons 1i and 2i remain without connections, but the button AR maintains the connection of the base of the transistor 102 with ground via 111, 126, and the base of the transistor 104 remains connected to ground via 112, 125.

Under these conditions, the coils 105 and 107 are supplied with current and the first speed is engaged.

When the speed of the vehicle is increased, the blade 116, of which the return spring is the weaker, is the first to yield to the force of the rocking lever (as explained in connection with FIGURE 1), and the transistor 104 is de-energized, so that only the coil 105 is supplied with current; the gearbox changes to second speed.

When the speed of the vehicle increases still further, the blade 117 in its turn yields to the rocking lever and the transistor 102 is in its turn de-energized. None of the three electromagnetic valve coils is supplied with current: the gearbox is in third speed.

The return movements are effected in the same way, by reverse automatic operations, as has been seen in respect of the simplified arrangement of FIGURE 1.

If the button 2i is depressed, it adds to the previous connection the imposed connection to ground of the base of transistor 102, so that the third speed can no longer be reached.

If the button 1i is depressed, it is readily seen that the connection to ground of the base of 102 (through the second row contacts) is maintained and that there is added the imposed base grounding of 104, so that the second and third speeds are both unattainable, only the first remaining accessible.

If pressure is applied to the button AR, the base of 102 can no longer be connected to ground through the first row contacts of AR, but its fourth row contacts connect the bases of the transistors 103 and 104 to the contact 125 of the governor, which is connected to ground through the blade 116.

Under these conditions, the coils 106 and 107 are energized, this corresponding to the gearbox being brought to reverse. A rather lively travel in reverse excludes the possibility of the blade 116 being able to yield, thus bringing the gearbox to the third advance gear, because an appropriate blocking device is provided for this purpose by a stop on the cup 15 when it tends to turn in the reverse direction.

All these previous circumstances can be summarized in the following table, in which, as regards the arrangement of FIGURE 1, the excitation of each of the coils 105, 106, 107 of the electromagnetic valves is represented by the plus sign and the non-excitation thereof by the minus sign.

| Button pressed | Coil 105 | Coil 106 | Coil 107 | Ratio obtained |
| --- | --- | --- | --- | --- |
| N | + | + | + | Neutral. |
| AV | + | − | + | 1st forward. |
| AV | + | − | − | 2nd forward. |
| AV | − | − | − | 3rd forward. |
| 2i | + | − | + | 1st forward. |
| 2i | + | − | − | 2nd forward. |
| 1i | + | − | + | 1st forward. |
| AR | − | + | + | Reverse gear. |

Figure 4:
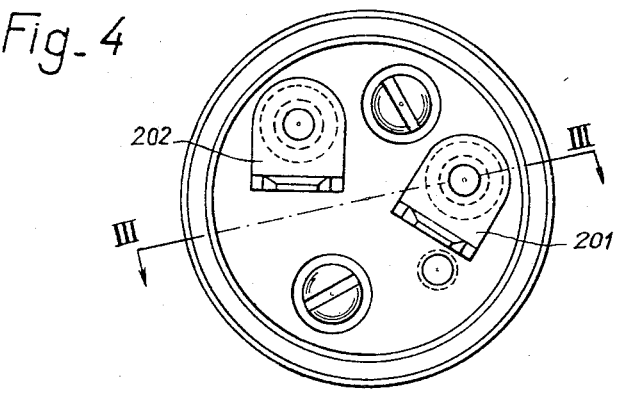
FIGURE 4 is a view of the foregoing from below, in the direction of the arrow IV.
Figure 3:
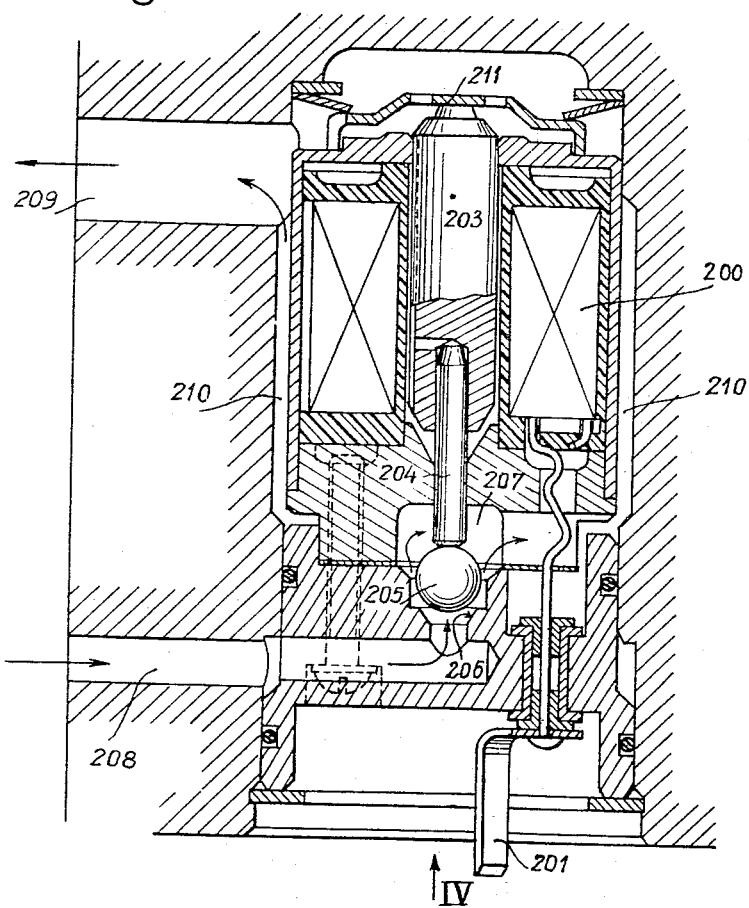
FIGURE 3 is a section on the line III—III of FIGURE 4, showing a ball-type discharge valve.

Within the scope of the present invention, it is also expedient to refer to a particularly advantageous form of electromagnetic valve, which is illustrated in FIGURES 3 and 4.

In these figures, 200 is the coil of the electromagnet fed by the terminals 201 and 202; 203 is the movable core thereof, which is of the "plunger" type, in which is encased an operating rod 204. A ball 205 constitutes the movable stopping member of a liquid valve, the seat of which is at 206. A chamber 207, which contains the ball and into which extends the end of the rod 204, is connected on the one hand to the liquid inlet pipe 208 (through the valve 205, 206) and on the other hand to the liquid outlet pipe 209 (through the lateral, spaces 210).

This entire apparatus is immersed in the functional liquid being used (which is for example oil), this readily enabling a perfect sealing to be obtained.

When the coil 200 is not supplied with current, the ball 205 expels the rod 204 of the plunger and holds the latter in abutment with a plate 211 fixed to the head of the apparatus because of the dynamic pressure of the liquid acting on this ball. The liquid then passes freely from the inlet 208 to the outlet 209 of the apparatus, the effect of which is to bring the associated distributor to the position connected to the discharge of the controlled hydraulic actuator.

When the coil 200 is supplied with current, the plunger 203 presses the rod 204 on the ball 205, which is applied to its seat 206, cutting out the electromagnetic valve. As a result, the associated distributor is placed in a position for supplying pressure from the pump to the controlled hydraulic actuator.

As will be seen, a return spring for the ball 205 is superfluous, since on opening, it is the liquid which drives the ball from its seat by its static pressure and which holds it at the end of its travel by its dynamic pressure.

According to a modified embodiment, the electromagnetic valve of FIGURE 3 and 4 is replaced by a more electromagnetic valve, in which the core 203 and the plunger 204 are combined with the ball 205, which is then the only movable part. Such an electromagnetic valve has been described in the patent application filed in France by the same applicant on Oct. 20, 1964 and entitled "Electromagnetic Valve."

I claim:

1. An automatic control mechanism for gearboxes of automobile vehicles comprising a tachometric contactor governor, a plurality of control channels operatively connecting said governor to hydraulic actuators for said gearbox, each said channel comprising a transistorized amplifier means, a discharge electromagnetic valve responsive to said amplifier means, and a distributor responsive to said valve and connected to actuate said gearbox hydraulic actuators, the transistors of said amplifiers having their bases selectively connected to ground through a contact of said governor and to the positive terminal of a battery through a damping resistance, the emitters of said transistors being connected to said positive battery terminal through an exciting coil of the associated electromagnetic valve, and the collectors of said transistors being grounded whereby breaking sparks of said contactor are quenched.

2. An automatic control mechanism according to claim 1 in which each electromagnetic valve comprises an electromagnet having a movable core of the plunger type, a valve having a ball forming the closure member, during the excitation of said electromagnet said ball being applied to its seat by the plunger, said valve being opened upon deenergization of said electromagnet solely by the effect of the pressure of the liquid rejecting and holding the ball in the position of full opening of the valve, all the elements of said apparatus being immersed in the functional liquid of said hydraulic control system.

3. An automatic control mechanism according to claim 1 in which said electromagnetic valve comprises an electromagnet having as a movable core a ball which, during the energization of said electromagnet, is applied to a fixed core of said electromagnet.

References Cited
UNITED STATES PATENTS

| | | | |
|---|---|---|---|
| 2,855,794 | 10/1958 | Faisandier | 74—472 |
| 3,122,940 | 3/1964 | Shimwell et al. | 74—472 |
| 3,126,989 | 3/1964 | Baumann | 74—472 |
| 3,234,857 | 2/1966 | De Castelet | 9—414 |
| 3,267,762 | 8/1966 | Reval | 74—472 |
| 3,299,234 | 1/1967 | De Castelet | 200—61.45 |

ROBERT M. WALKER, *Primary Examiner.*

DONLEY J. STOCKING, *Examiner.*

H. S. LAYTON, *Assistant Examiner.*